United States Patent [19]

Rebeaud

[11] Patent Number: 5,780,082
[45] Date of Patent: Jul. 14, 1998

[54] PROCESS FOR MAKING A FOOD PRODUCT OF THE PIZZA TYPE, IN THE SHAPE OF A POCKET

[75] Inventor: Isabelle Rebeaud, Pully, Switzerland

[73] Assignee: Alda Services S.A., Lausanne, Switzerland

[21] Appl. No.: 707,332

[22] Filed: Sep. 3, 1996

[30] Foreign Application Priority Data

Sep. 7, 1995 [FR] France ..................... 95 10482

[51] Int. Cl.$^6$ ..................... A21D 13/00
[52] U.S. Cl. ..................... 426/94; 426/138; 426/275; 426/282; 426/283; 426/496
[58] Field of Search ..................... 426/94, 275, 282, 426/283, 138, 496

[56] References Cited

U.S. PATENT DOCUMENTS

| | | | |
|---|---|---|---|
| 3,615,678 | 10/1971 | Tangel et al. | 426/94 |
| 4,283,431 | 8/1981 | Giordano et al. | 426/94 |
| 4,400,404 | 8/1983 | Persi | 426/94 |
| 4,661,361 | 4/1987 | Mongiello et al. | 426/94 |
| 5,312,633 | 5/1994 | Schwartz | 426/94 |

*Primary Examiner*—Lien Tran
*Attorney, Agent, or Firm*—Cummings & Lockwood

[57] ABSTRACT

A process for the manufacture of a food product of the pizza type, in the shape of a pocket and edible as a sandwich, and the product obtained thereby. The process consists of: cooking a bottom raised pizza crust with its ingredients, of roughly rectangular shape, in a pizza oven, on the hearth and at the ambient heat of this oven, in the classical manner, up to a point near complete cooking; covering the bottom crust with its ingredients thus cooked with a thin raised pizza crust forming an envelope and enclosing the ingredients in a hermetic manner on the bottom crust, and making it one piece with the bottom crust by its edges; and placing the assembly obtained in the manner in the oven once again so as to cook the enveloped crust.

9 Claims, 1 Drawing Sheet

PROCESS FOR MAKING A FOOD PRODUCT OF THE PIZZA TYPE, IN THE SHAPE OF A POCKET

BACKGROUND OF THE INVENTION

1. Field of the Invention

The invention concerns a manufacturing process for a food product of the pizza type, in the shape of a pocket and edible as a sandwich, and the product obtained thereby.

2. Background of the Related Art

It is known that a pizza cannot be consumed without requiring a plate due to its size and its round shape. In addition, the division of this pizza into parts, whether they are triangular or rectangular is not suited for simultaneous handling and consumption because the various ingredients involved can drip or fall.

Moreover, pizzas in the form of turnovers are known, whose ingredients enclosed by folding of the crust are cooked inside the folded envelope. Nevertheless, the cooking of the inner ingredients is not obtained due to the upper crust envelope, which constitutes a thermally insulating envelope, but a satisfactory cooking of the ingredients leads to overcooking of the crust envelope and to its burning. Moreover, incomplete cooking of the inner ingredients clearly reduces the taste qualities of this pizza. Moreover, the roughly half-circular and non-rigid shape of this type of pizza and the fact that the ingredients are undercooked and can drip does not permit its simultaneous handling and consumption as a sandwich.

SUMMARY OF THE INVENTION

The invention seeks to remedy this disadvantage and proposes a manufacturing process for a food product, of the pizza type, characterized in that it consists of:

- preparing a first raised pizza crust, designed to form the bottom of the pizza, of a roughly rectangular shape with the format of the product to be obtained;
- arranging in the classical manner on this raised bottom crust the various pizza ingredients chosen, such as tomato sauce, mushrooms, ham, etc.
- cooking this crust with its ingredients in a pizza oven, on the hearth and at the ambient heat of this oven, in the classical manner, up to a point close to complete cooking.
- covering the bottom crust with its ingredients thus cooked with a thin raised pizza crust, forming an envelope and enclosing the ingredients in a hermetic manner on the bottom crust, and joining it with this bottom piece by its edges, and
- putting the assembly obtained in the oven again so as to cook the envelope crust.

Naturally, the cooking time of the thin envelope crust is less than the cooking time of the garnished bottom crust (due to its thinness), thus permitting the complete cooking of the assembly.

It results from this arrangement that one obtains a pizza, in the shape of a pocket, like a sandwich, and whose format is that of the bottom crust, which is closed and has a certain rigidity resulting from the cooking of the assembled crusts, and permitting its simultaneous handling and consumption without requiring a plate, like a sandwich.

Moreover, the cooking is that of a traditional pizza with its taste qualities; the envelope crust only provides the packaging of the product.

Preferably, the surface format of the envelope crust is slightly larger than that of the bottom crust to permit the covering of this latter with its ingredients by folding its longitudinal and lateral edges under the periphery of the bottom cooked crust. This arrangement improves the envelope effect.

The invention also concerns food products obtained by the implementation of the process defined above.

BRIEF DESCRIPTION OF THE DRAWINGS

The invention is illustrated below by means of an example of embodiment and in reference to the attached drawing in which.

DETAILED DESCRIPTION OF THE PREFERRED EMBODIMENTS

Figure 1:
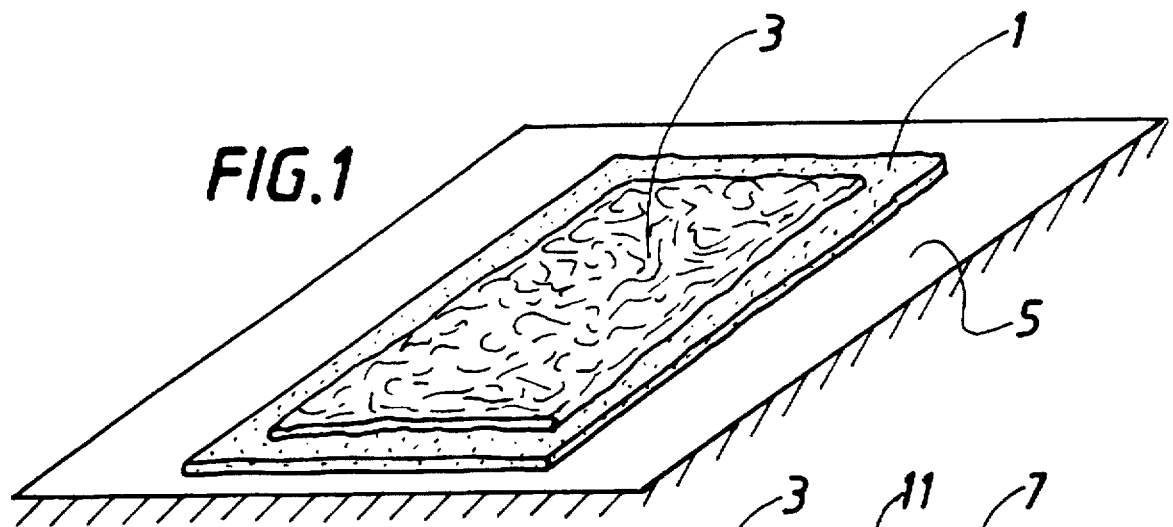
FIG. 1 is a perspective view showing the cooking of the bottom crust with its ingredients, according to the process of the invention.

With reference to FIG. 1, first a classical raised pizza crust 1 is prepared that is spread over a work table according to a rectangular or similar format, for example, of a width of approximately 8 cm, a length of approximately 25 cm and a thickness of approximately 1 to 2 mm, this elongated format roughly corresponding to that of a sandwich. It may possibly be of a shape other than rectangular, nevertheless retaining its elongated character. Then the topping ingredients 3 are arranged and spread out in the classical manner, such as pouring of the tomato sauce, mushroom and cheese pieces, depending on the choice of pizza. A spatula is slid under this crust to raise it and introduce it into a classical pizza oven, with a refractory hearth and arches heated between 250° and 300° C., and crust 1 is positioned with its toppings 3 on hearth 5. Cooking is effected at the ambient heat of the oven for ingredients 3 and by contact with hearth 5 for bottom crust 1, in the classical manner, as for a traditional pizza, for a time of approximately 60 seconds.

Then, the assembly of cooked bottom crust 1 and toppings 3 is removed from the oven and positioned on the work table again.

Figure 2:
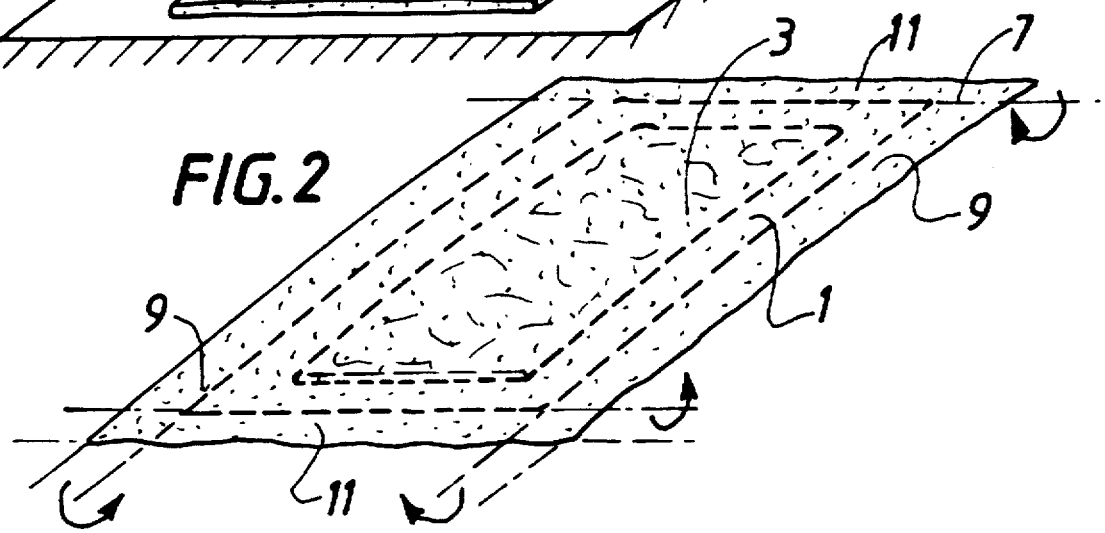
FIG. 2 is a perspective view showing the positioning of the envelope crust on the bottom crust before folding the envelope.

A raised envelope pizza crust 7 is already made and present on the work table, extending in a roughly rectangular shape slightly larger than bottom crust 1, i.e., for example, of an approximately 10-cm width, 27-cm length and approximately 1 mm thick or less. This crust 7 is handled manually to position it in a centered fashion on the assembly of cooked crust 1 and toppings 3 (FIG. 2). It is sufficient to fold over the edges of this crust under the bottom, which is rigid, i.e., the two longitudinal edges 9 and then the two other edges 11 of the sides of the width under the periphery of the paste of bottom 1, in the shape of a billfold. The assembly is then hermetically sealed.

Figure 3:
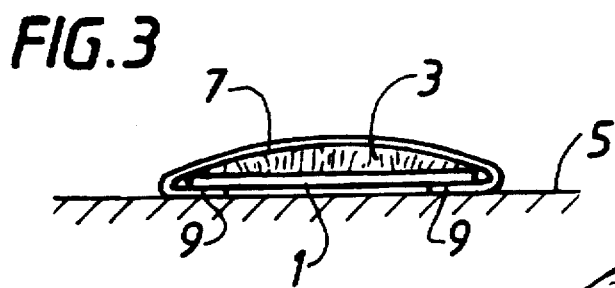
FIG. 3 is a cross-sectional median view of the cooked product obtained.

This assembly is again held by the spatula to introduce it into the pizza oven in view of cooking envelope crust 7. Cooking is effected in a time corresponding to the cooking of the thin envelope crust, approximately 30 seconds. It will be noted that the folds of envelope 9, 11 isolate the cooked bottom crust 1 (rigid) from contact with hearth 5 of the oven (FIG. 3), of the thickness of envelope crust 7, therefore without [further] cooking bottom crust 1. Moreover, ingredients 3 are thermally insulated by envelope crust 7.

Figure 4:
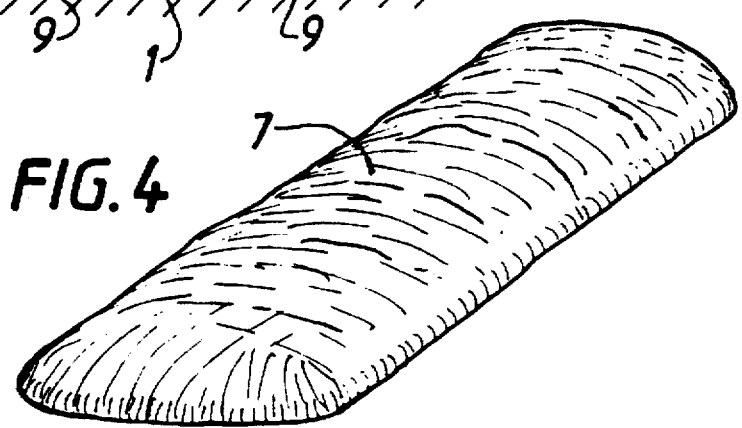
FIG. 4 is a perspective view of this product.

It is sufficient to remove from the furnace after this second cooking the assembly of cooked pizza, which is in the form of a pocket, as shown in FIG. 4.

The product can then be consumed like a sandwich, in a protective sheath of the paper type open at one end, or eaten cold or it can be reheated.

Naturally, variations of embodiment of the invention can be introduced.

The envelope crust can be joined with the bottom crust by press-folding its longitudinal folds under the bottom crust and simple contact on the ends of the wide sides of the bottom crust, and cooking will make rigid the envelope crust enclosing the pizza pocket obtained.

Moreover, the invention is not limited to pizza crusts, but [other] crusts becoming rigid upon cooking may also be suitable, as well as ingredients other than those used for making pizzas.

I claim:

1. A method of manufacturing a pizza pocket, comprising the steps of:
   a) preparing a first pizza crust dimensioned and configured to define a bottom portion of a pizza pocket;
   b) arranging pizza toppings on a top surface of said first pizza crust;
   c) placing said first pizza crust and associated pizza toppings on a hearth in an oven;
   d) cooking said first pizza crust and associated pizza toppings in said oven for approximately 60 seconds such that said first pizza crust and associated pizza toppings are cooked to a condition close to completion;
   e) removing said first pizza crust and associated pizza toppings from said oven;
   f) covering said first pizza crust and associated pizza toppings with a second uncooked pizza crust, thinner than said first pizza crust, to define a top portion of said pizza pocket;
   g) joining edges of said first pizza crust and said second pizza crust to form a pizza pocket enclosing said pizza toppings;
   h) placing said pizza pocket in said oven; and
   i) cooking said pizza pocket in said oven for a time sufficient to cook said pizza pocket to completion.

2. A method according to claim 1, wherein said step of preparing said first pizza crust further includes the step of forming said first pizza crust in an elongated generally rectangular configuration.

3. A method according to claim 2, wherein further comprising the step of forming said second pizza crust in an elongated generally rectangular configuration having a width and a length greater than that of said first pizza crust.

4. A method according to claim 3, wherein said step of forming said first pizza crust includes providing said first pizza crust with a width of approximately 8 cm and a length of approximately 25 cm.

5. A method according to claim 4, wherein said step of forming said second pizza crust includes providing said second pizza crust with a width of approximately 10 cm and a length of approximately 27 cm.

6. A method according to claim 5, wherein said step of joining said first pizza crust and said second pizza crust includes the steps of folding the lengthwise edges of said second pizza crust under said first pizza crust, and applying the widthwise edges of said second pizza crust to said first pizza crust by simple contact.

7. A method of manufacturing a pizza pocket, comprising the steps of:
   a) preparing a first elongated generally rectangular pizza crust to define a bottom portion of a pizza pocket;
   b) arranging pizza toppings on a top surface of said first pizza crust;
   c) placing said first pizza crust and associated pizza toppings on a hearth in an oven;
   d) cooking said first pizza crust and associated pizza toppings in said oven for approximately 60 seconds such that said first pizza crust and associated pizza toppings are cooked to a condition close to completion;
   e) removing said first pizza crust and associated pizza toppings from said oven;
   f) covering said first pizza crust and associated pizza toppings with a second uncooked elongated generally rectangular pizza crust, thinner than said first pizza crust, to define a top portion of said pizza pocket, said second pizza crust having a length and a width greater than that of said first pizza crust;
   g) folding lengthwise edges of said second pizza crust under said first pizza crust, and applying said widthwise edges of said second pizza crust to said first pizza crust to form a pizza pocket enclosing said pizza toppings;
   h) placing said pizza pocket in said oven; and
   i) cooking said pizza pocket in said oven for approximately 30 seconds to cook said pizza pocket to completion.

8. A method according to claim 7, further comprising the step of providing said first pizza crust with a width of approximately 8 cm and a length of approximately 25 cm.

9. A method according to claim 7, further comprising the step of providing said second pizza crust with a width of approximately 10 cm and a length of approximately 27 cm.

* * * * *